Patented Dec. 5, 1933

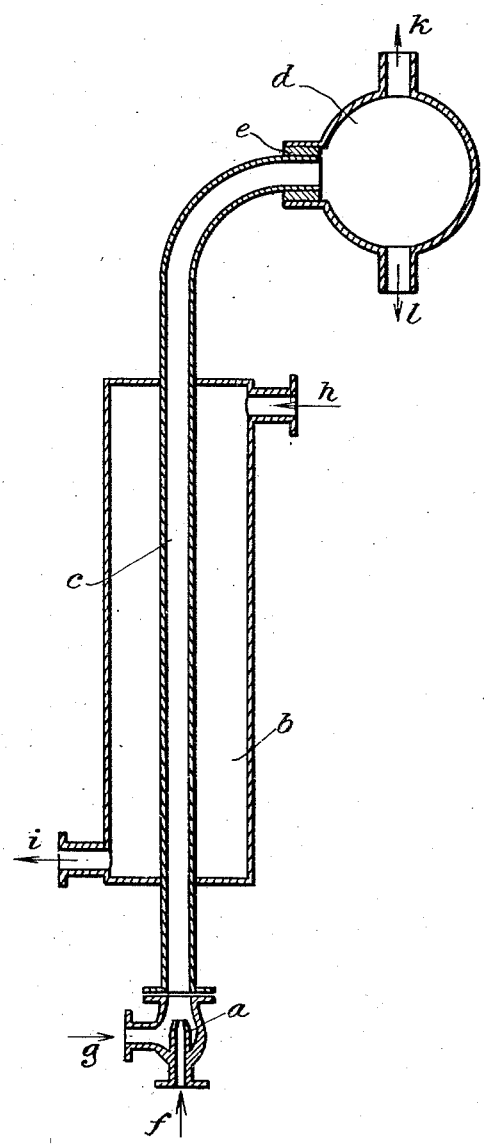

1,937,682

UNITED STATES PATENT OFFICE 1,937,682

METHOD OF PRODUCING HYDROGEN PEROXIDE

Friedrich Boedecker, Berlin-Dahlem, and Jon Seemann, Berlin-Tempelhof, Germany, assignors, by mesne assignments, of one-half to E. I. du Pont de Nemours & Company, a corporation of Delaware, and one-half to Buffalo Electro-Chemical Co., Inc., a corporation of New York Application September 11, 1930, Serial No. 481,232, and in Germany May 22, 1928

3 Claims. (Cl. 202—64)

This invention relates to the production of hydrogen peroxide.

Hydrogen peroxide was hitherto obtained from solutions in which this substance is formed on heating, for instance, from persulfate or persulfuric acid solutions &c. by distilling these solutions in vacuo.

Now we have found that hydrogen peroxide may be obtained from such solutions most advantageously by finely subdividing them with superheated steam in a vessel communicating with the vacuum and to which simultaneously heat is applied, for instance, by conducting a current of steam around the vessel or providing an internal heating device therein. In this way an output is obtained which surpasses that obtainable by distilling the said solutions without employing steam and gives a higher yield of hydrogen peroxide from a given volume of the starting solution. This is even the case when solutions are used which cannot be considered to be free from catalysts.

The process can be carried out in a continuous operation. For instance, the sulfuric ammonium persulfate solutions obtained by electrolyzing sulfuric ammonium sulfate solutions may be continuously introduced into the distilling vessel, the vapors containing the hydrogen peroxide being condensed in the condensing vessels after separating the liquid residue from the distillation. By suitably rectifying and fractioning the condensate the hydrogen peroxide may be obtained in the desired concentration.

The result aimed at is further facilitated by preheating the solution to be distilled to 50—90° C., for instance. Relatively diluted solutions may be subjected to distillation, but it may be preferred to first evaporate the solutions to higher concentrations.

The process may be carried out in the following manner:—

5 liters of a 20 per cent ammonium persulfate solution obtained by electrolysis and containing, besides ammonium sulfate, about 10 per cent of sulfuric acid, are treated in an apparatus as shown in the annexed drawing to obtain hydrogen peroxide. The solution entering at $g$ under the action of the vacuum (of 40 millimeters, for instance) is finely subdivided in the nozzle $a$ by superheated steam entering at $f$ with a temperature of 220° C. and under a pressure of 5 atmospheres and conducted through a pipe $c$ consisting of a sulfuric-acid-proof material. This pipe is surrounded by a steam jacket $b$ having a steam inlet $h$ and an outlet $i$. The hot mixture of steam and residue enters the bulb $d$ of ceramic material in which the gaseous constituents are separated from the non-gaseous ones. The former are conducted through the pipe $k$ to the condensers evacuated by a pump, whereas the latter flow through the tubulure $l$ into a suitable storing vessel.

We claim:—

1. In the method of producing hydrogen peroxide from acid persulfate solutions in a continuous distillation process, the steps which comprise injecting superheated steam upwardly through a body of acid persulfate solution, said solution being continuously supplied to maintain the body of the solution whereby a portion of the acid persulfate solution is atomized, hydrogen peroxide vaporized therefrom, and drawing the atomized solution and hydrogen peroxide vapor by means of vacuum through a heated zone at a temperature sufficient to maintain the hydrogen peroxide so vaporized in the vapor state.

2. In the method of producing hydrogen peroxide from solutions in which this substance is formed on heating, the steps which comprise injecting superheated steam upwardly through a body of such solution, the solution being continuously supplied to maintain the body thereof, whereby a portion of the solution is finely subdivided and hydrogen peroxide formed and vaporized therefrom, and drawing the finely subdivided material and vapor by means of vacuum through a heated zone at a temperature sufficient to maintain the hydrogen peroxide so vaporized in the vapor condition.

3. The method of producing hydrogen peroxide from acid persulfate solutions in a continuous distillation process, which comprises injecting superheated steam upwardly through a body of acid persulfate solution, said solution being continuously supplied to maintain the body of the solution whereby a portion of the acid persulfate solution is atomized, hydrogen peroxide vaporized therefrom, drawing the atomized solution and hydrogen peroxide vapor by means of vacuum through a heated zone at a temperature sufficient to maintain the hydrogen peroxide so vaporized in the vapor state, separating the vapors from the liquid, and condensing the vapors.

FRIEDRICH BOEDECKER.
JON SEEMANN.